(12) United States Patent
Fich (10) Patent No.: US 11,786,850 B2
(45) Date of Patent: Oct. 17, 2023

(54) KEY SYSTEM TO ENSURE CORRECT USE OF INSERTS

(71) Applicant: C.C. Jensen A/S, Svendborg (DK)

(72) Inventor: Jens Fich, Odense (DK)

(73) Assignee: C.C. JENSEN A/S, Svendborg (DK)

( * ) Notice: Subject to any disclaimer, the term of this patent is extended or adjusted under 35 U.S.C. 154(b) by 93 days.

(21) Appl. No.: 16/949,628

(22) Filed: Nov. 9, 2020

(65) Prior Publication Data

US 2021/0053001 A1 Feb. 25, 2021

Related U.S. Application Data

(63) Continuation of application No. 15/313,011, filed as application No. PCT/EP2015/061243 on May 21, 2015, now Pat. No. 10,843,109.

(30) Foreign Application Priority Data

May 21, 2014 (EP) ..................... 14169236

(51) Int. Cl.
*B01D 35/30* (2006.01)
*B01D 25/26* (2006.01)
*B01D 29/31* (2006.01)

(52) U.S. Cl.
CPC ............ *B01D 35/30* (2013.01); *B01D 25/26* (2013.01); *B01D 29/31* (2013.01); *B01D 2201/4046* (2013.01); *B01D 2201/4053* (2013.01)

(58) Field of Classification Search
CPC ........ B01D 35/30; B01D 25/26; B01D 29/31; B01D 2201/4046; B01D 2201/4053; B01D 2201/291; B01D 29/15
See application file for complete search history.

(56) References Cited

U.S. PATENT DOCUMENTS

| 4,521,309 A | 6/1985 | Pall |
| 2003/0024870 A1 | 2/2003 | Reinhart |

(Continued)

FOREIGN PATENT DOCUMENTS

| CN | 203886239 U | 10/2014 |
| CN | 102781542 B | 7/2015 |

(Continued)

OTHER PUBLICATIONS

European Search Report; Application No./Patent No. 20158945.4-1104; European Patent Office; Munich, Germany. Date of Completion: Apr. 1, 2020. 8 pp.

*Primary Examiner* — Waqaas Ali
(74) *Attorney, Agent, or Firm* — Noréns Patentbyrå AB (57) ABSTRACT

An oil filter for an oil filtration system. The filter is configured for insertion into an oil filtration unit. The filter comprises a central opening extending along a central axis of the filter, at least one second physical structure having a second cross sectional shape and a predefined longitudinal length in relation to the central axis of the filter, and an inner periphery of the second physical structure being arranged to mate with the outer periphery of the first physical structure allowing the filter to reach its correct insertion position in the oil filtration unit by the second physical structure at least partly surrounding the first physical structure. The end surface of the filter relative to the central axis of the filter comprises the second physical structure, and the second physical structure comprises a material configured to serve as a filtering material of the filter.

18 Claims, 8 Drawing Sheets

(56) References Cited

U.S. PATENT DOCUMENTS

| | | | |
|---|---|---|---|
| 2006/0162305 A1 | 7/2006 | Reid | |
| 2007/0241045 A1 | 10/2007 | Kott et al. | |
| 2007/0289915 A1* | 12/2007 | Jiang | F02M 37/28 210/450 |
| 2008/0135469 A1* | 6/2008 | Fremont | F02M 37/24 210/314 |
| 2009/0078658 A1 | 3/2009 | Meddock et al. | |
| 2013/0228504 A1 | 9/2013 | McElroy et al. | |

FOREIGN PATENT DOCUMENTS

| | | |
|---|---|---|
| DE | 1261482 B | 2/1968 |
| DE | 102009050587 A1 | 4/2011 |
| EP | 1281426 A1 | 2/2003 |
| JP | S37013840 B2 | 11/1959 |
| JP | 2002102609 A | 4/2002 |
| WO | 2013130765 A1 | 9/2013 |

* cited by examiner

KEY SYSTEM TO ENSURE CORRECT USE OF INSERTS

The present invention relates to an oil filtration system.

It has been known for several years to use oil for lubricating the movable parts in various types of machinery. Similarly, it has been known that the oil gets contaminated after having been used for some time. Thus, it is advantageous to filter the oil e.g. to avoid breakdown of the machinery, to prolong the lifetime of the various components and to reduce the expenses for maintenance. One type of oil filtration units comprises an outer shell in which an oil filter is inserted. Typical systems used for mounting the oil filters in the outer shell comprises rubber sealings assisted by applying a sealing pressure by either springs or tightening of bolts etc. Normally, these mounting systems do not have a specific function directed towards assuring that the wrong insert does not get mounted, which means that there is a considerable risk that a wrong type of insert can be mounted in an oil filtration unit which may increase the risk of a breakdown of machinery due to an incorrect oil filtration scheme.

To remedy the above disadvantage, various modifications and variants of oil filtration systems have been proposed. Examples include US 2006/0162305 A1 which relates to a key system for filters and their connecting heads, brackets or other holders. The filter cartridge and its holder each has a keyed surface, one being a protruding keyed surface, one being a protruding key and one being a recessed lock. Cooperation of these keyed surfaces is required in order for the filter cartridge to be installed in the holder, so that mismatched cartridges cannot be installed into the holder, for example, to prevent a particular type of cartridge from being placed in a filtration or other process where it would be inappropriate, or undesired. The keyed surfaces are selectively locatable preferably at different circumferential locations on a perimeter of the head/holder. The perimeter may be, for example, on an outer shoulder surface of a filter and an inner surface of a valve head, or on outer and inner surfaces of connectors that provide a liquid seal between the filter and the head/holder.

Known oil filtration systems, which include a mounting system ensuring that the wrong oil filter does not get installed, are complicated and expensive to manufacture.

It is a first aspect of the present invention to provide an oil filtration system which is simple and inexpensive.

It is a second aspect of the present invention to provide an oil filtration system which ensures correct insertion of the correct type of filter in a given oil filtration unit.

It is a third aspect of the present invention to provide an oil filtration system which uses a simple procedure for installing and replacing filters.

It is a fourth aspect of the present invention to provide an oil filtration system which eliminates the risk of leakage.

It is a fifth aspect of the present invention to provide an alternative to the oil filtration systems of the kind mentioned in the opening paragraph.

The novel and unique way in which these and other aspects are achieved according to the present invention is the fact that the oil filtration system comprises:
- an oil filtration unit,
- an oil filter having a central opening extending along a central axis of the oil filter,
- the oil filtration unit being provided with at least one first physical structure having a first cross-sectional shape and a predefined longitudinal length in relation to a central axis of the oil filtration unit,
- the oil filter being provided with at least one second physical structure having a second cross sectional shape and a predefined longitudinal length in relation to the central axis of the oil filter and
- an inner or outer periphery of the second physical structure being arranged to mate with the outer or inner periphery of the first physical structure allowing the oil filter to reach its correct insertion position in the oil filtration unit
- where at least one of the end surfaces of the oil filter relative to the central axis of the oil filter comprises the at least one second physical structure.

In accordance with the invention, there is further provided an oil filtration system comprising:
- an oil filtration unit having a central projection extending along a central axis of the oil filtration unit,
- an oil filter having a central opening extending along a central axis of the oil filter, where the central opening of the oil filter is adapted to be introduced onto the central projection of the oil filtration unit in the direction of the central axis of the oil filtration unit,
- the oil filtration unit being provided with at least one first physical structure having a first cross-sectional shape and a predefined longitudinal length in relation to the central axis of the oil filtration unit,
- the oil filter being provided with at least one second physical structure having a second cross sectional shape and a predefined longitudinal
- length in relation to the central axis of the oil filter and
- an inner or outer periphery of the second physical structure being arranged to mate with the outer or inner periphery of the first physical structure allowing the oil filter to reach its correct insertion position in the oil filtration unit,
- where at least one of the end surfaces of the oil filter relative to the central axis of the oil filter comprises the at least one second physical structure.

Typically, the oil filters used in oil filtration units can be made with substantially similar geometry, i.e. the exterior shape, but when it comes to the purpose, physical characteristics, properties and function of the oil filters, the filters may be very different from each other. For this reason, it is a risk that an oil filter with the wrong properties is installed in an oil filtration unit. Installation of the wrong type of filter, in terms of function and/or quality, may lead to a detrimental reduction in the expected life-time of the system which utilises the oil and the function and/or lifetime of the filter.

Thus, the provision of an oil filtration system with at least one first and one second physical structure, where an inner or outer periphery of the second physical structure is arranged to mate with the outer or inner periphery of the first physical structure, allows the correct type of oil filter to reach its correct installation position in the oil filtration unit. At correct installation and thus at the operational position of the filter, the at least first and second physical structures thus engage each other. For this reason, the user of the oil filtration unit can be assured that only filters with a physical structure, which matches in peripheral shape with the peripheral shape of the physical structure of the oil filtration unit, is installed. This requirement prevents the wrong type of filter from reaching the correct insertion position in the oil filtration unit and thus from being installed in the oil filtration unit. Thus, correct insertion of the correct type of filter in a given oil filtration unit is ensured.

The oil filtration system can thus be understood as comprising a key system for mounting an oil filter in an oil filtration unit, where the key system comprises at least one key assembly comprising:

a key with an outer cross-sectional shape, and a keyhole with an inner cross-sectional shape, wherein the inner periphery of the cross-sectional shape of the keyhole is similar in shape and size to the outer periphery of the cross-sectional shape of the key. This would be the situation if the oil filter had a keyhole that had to fit to a key provided in relation to the oil filtration unit in order for the filter to be installed correctly in the oil filtration unit. At correct installation, the keyhole can thus be understood as encircling or surrounding the key.

Having an end surface of the oil filter comprise the at least one second physical structure has the advantage that the second physical structure may form part of the filter e.g. by comprising a similar material and as such be an active component in the filtering process. Alternatively, if the second physical structure was arranged on the oil filter, e.g. on an end surface of the oil filter, but did not comprise a material suitable for oil filtration, the second physical structure would take up space and thus influence the filtering capacity of the oil filter.

Provided that at least one end of the end surfaces of the oil filter comprises the at least one second physical structure, easy disposal of the oil filter is facilitated. Thus, in case the at least one second physical structure comprises the same material as the oil filter, there is no need for arranging a disposal process for the at least one second physical structure different from the disposal process for the oil filter. In case the oil filter and the second physical structure may comprise a natural or synthetic polymer such as cellulose, they may e.g. be disposed of by incineration.

Mounting the at least one second physical structure on one or both end surfaces of the oil filter facilitates easy installation of the at least one second physical structure on the oil filter, both in the case where the at least one second physical structure is mounted during production of the oil filter, and in the case where it is mounted after the production of the oil filter. The reason is that the user thus has full visual contact with the at least one second physical structure and has a higher rate of success in mounting the oil filter correctly.

In an embodiment, the oil filtration unit can have a projection extending in the direction of the central axis of the oil filtration unit. Said projection may comprise the at least one first physical structure and may be arranged either along the central axis of the oil filtration unit or away from said central axis.

In one embodiment, the central projection of the oil filtration unit can comprise the at least one first physical structure, the central projection preferably being a stay bolt. A stay bolt can thus be an extension of the central projection of the oil filtration unit. Installing a stay bolt in an oil filtration unit ensures a more stable and easy installation of the oil filter in the oil filtration unit. Furthermore, the stay bolt can facilitate installation of more than one physical structure along the center axis.

When inserting a filter in an oil filtration unit, a central projection, such as a stay bolt, functions as a guiding element for the user when installing the filter. Basically, the user only has to apply the central opening of the filter on the open end of the central projection and then slide the filter towards the bottom (or top) of the oil filtration unit, and finally rotate the filter until the first and second physical structures are aligned and engage each other. This way, the user does not have to worry about joining the first and second physical structures before rotating the oil filter until they engage each other which can be difficult due to low visibility inside the oil filtration unit after inserting the oil filter. Thus, a simple procedure of installing and replacing filters is provided.

Moreover, the production of the first physical structure is easy as it can be turned on a turning lathe or cast together with the stay bolt. Furthermore, if the physical structure is broken some time or if the function of the oil filtration unit changes, the physical structure can thus easily be replaced.

In one embodiment, an end surface of the oil filtration unit can comprise the at least one first physical structure.

Within the scope of the present invention, an "oil filtration unit" can have the shape of a substantially cylindrical container. In general, the oil filtration unit can comprise two parts—a first part and a second part. The first part consists of one end surface and the side surface of the substantially cylindrical container. Typically, the first part can be connected to the apparatus containing the oil which has to be filtered by the oil filtration unit. The second part can consist of the other end surface, and can be understood to function as a lid, and is thus typically only connected to said apparatus by way of its attachment with the first part. Thus, within the scope of the present invention, but not limited to, the term "end surface" can comprise the inner surface of the first part of the oil filtration unit or the inner surface of the second part of the oil filtration unit. Furthermore, said inner end surface may be a separate disc which may be inserted into an existing oil filtration unit comprising side walls and an inner end surface or be connected to the side walls of an oil filtration unit and thus constitute the end surface of the oil filtration unit, or be produced together with the side walls of the oil filtration unit as one unit. Other shapes and sizes of the oil filtration unit are also intended to be included in the present invention. For instance, the oil filtration unit could, but is not limited to, consist of two substantially symmetrical parts, both comprising an end and side surfaces, or the oil filtration unit could have the shape of a substantially cubic container.

The first physical structure can be produced as part of the end surface of the oil filtration unit during the initial production of the oil filtration unit as the risk of an unintentional change of the type of filters suitable for use in the oil filtration unit can thus be considerably reduced, or at best eliminated. If produced as part of the end surface, the first physical structure cannot simply be removed, e.g. by rotation or pressure. The user has to e.g. saw or cut it off. Thus, it has to be the intention of the user to deliberately remove the first structure with the risk of destroying the whole oil filtration unit.

Mounting the first physical structure at said end surface can involve either mounting it permanently, e.g. by use of welding, or mounting it with the possibility of removing it again, e.g. by use of a threaded installation in both the first physical structure and the end surface. When mounting the first physical structure permanently, the advantages stated in the above paragraph apply. When mounting the first physical structure temporarily, the user has the advantage that the first physical structure can easily be replaced either if broken or if the function of the oil filtration unit has changed so that another type of oil filter has to be used. It applies to both ways of mounting the first physical structure that it can be mounted in both new and already existing oil filtration units. Furthermore, no matter if the first physical structure has been mounted on or produced as a part of the end surface, placing the first physical structure at this position results in easy installation of both the first physical structure, i.e. just install it at the end surface, and of the filter, i.e. the user always knows that the first physical structure is placed at the end surface, so there is no need to investigate further.

Depending on how the end surface is defined in relation to the sides of the oil filtration unit, the first physical structure in one embodiment may also be mounted on or produced as part of the end surface which is not connected to the apparatus containing the oil which has to be filtered by the oil filtration unit, i.e. the end surface can constitute the lid. If the first physical structure has not been installed in the oil filtration unit from the start, it can thus more easily be installed in the end surface not connected to the apparatus as said end surface can be moved to a location suitable for performing the installation, e.g. a workshop.

In one embodiment, the at least one second physical structure can be located at any position along the central axis of the oil filter. Placing the second physical structure along the central axis of the oil filter means that the complexity of the formation of the oil filter is reduced as no difficult and precise measurement and alignment is required in order to make the second physical structure. It merely has to be placed along the central axis of the oil filter. Furthermore, the embodiment is advantageous in that more ways of varying the different types of filter exists as the position of the second physical structure is not limited to e.g. the ends of the oil filter, which means that the oil filter types can vary in regard to the position of the second physical structure along the central axis. Moreover, more than one second physical structure can thus be placed in the oil filter, e.g. one second physical structure at the one end of the oil filter and another second physical structure at the other end of the oil filter.

In one embodiment of the present invention, a planar structure, which is adapted to be mounted on at least one of the end surfaces of the oil filter, can comprise the at least one second physical structure. Producing the at least one second physical structure as part of a planar structure has the advantage that the user of the oil filter does not have to consider how to implement the at least one second physical structure in the production of the oil filter. The production of the planar structure can be part of a completely different production facility if wanted. Thus, the user can continue to use the same production facilities and tools, and does not have to amend an already functioning production facility.

A further advantage of producing the at least one second physical structure as part of a planar structure is that in case the user wants to change the function of the oil filtration unit so that a different type of oil filter is to be used, the production facility and templates for the new type of oil filter does not have to be amended according to the specific physical structure used on the oil filtration unit. Only the production of the planar structure has to be amended.

In one embodiment, at least a first set of first and second physical structures and a second set of first and second physical structures can be provided, and the first and second sets can be angled axially in relation to each other. Having a first and a second physical structure in the oil filtration unit facilitates that only a correct type of filter can be installed into the oil filtration unit. However, making use of only one such set of first and second physical structures could possibly be insufficient in some cases to avoid installation of the wrong type of filter. After being operated for a long time, the first physical structure could be at risk of being worn out of shape which could result in that another type of filter could fit into place. Furthermore, making use of only one set could in some cases open up for a deliberate amendment of the first physical structure and thus the type of filter used. Instead, making use of at least a first and a second set of physical structures minimises the above-mentioned risks of wrong use of the oil filtration unit as not only one set of physical structures, but two or more have to be worn out of shape or amended. A further advantage is that having not only one set of physical structures, but two or more increase the number of different types of oil filters that can be designed.

Advantageously, the first and second sets can be angled axially in relation to each other. Thus, the cross-sectional shapes of the first and the second sets of physical structures do not have to be different from each other, but merely have to be angled in relation to each other thus avoiding a wrong installation of the oil filter, e.g. avoid turning the oil filter up-side down.

Said first and second sets of physical structures may be arranged along the outer periphery of the oil filter so that the user may visually see said physical structures when inserting the oil filter in the oil filtration unit which facilitates easy and correct insertion of the oil filter. In case the oil filter has a substantially cylindrical shape, arranging said first and second sets along the outer periphery results in that said first and second sets are angled axially relative to each other.

In one embodiment, a first physical structure can be arranged at the central projection of the oil filtration unit, and at least one first physical structure may not be arranged at the central projection of the oil filtration unit, and corresponding second physical structures can be provided at the oil filter. As previously explained, the embodiment has the advantage compared to oil filtration systems comprising only one first and one corresponding second physical structure that the risk of the first physical structure being worn out of shape after use for a long time could result in another type of filter being able to fit into place, obviously depending on the specific shape. Furthermore, making use of only one first and second physical structure could in some cases open up for a deliberate amendment of the first physical structure and thus the type of filter used. Instead, making use of more than one first and second physical structure minimises the above-mentioned risks of wrong use of the oil filtration unit as not only one set of first physical structure, but two or more have to be worn out of shape or amended. Similarly, having not only one first and second physical structure, but two or more increases the number of different types of oil filtration units that can be designed with each their specific type of filter.

One example of implementation of the present embodiment could be a case in which a first physical structure is arranged at the central projection, and three first physical structures are placed symmetrically across the central axis of the oil filtration unit. Corresponding second physical structures are placed at the oil filter, e.g. mounted on or produced as a part of one of the end surfaces of the oil filter relative to the central axis of the oil filter, or alternatively, produced as part of a planar structure which is adapted to be mounted on at least one of the end surfaces of the oil filter.

The disclosed combinations have the technical production advantage that a very large number of various physical structure combinations can be produced solely by use of one standard cross-sectional shape. In other words, all oil filtering units can be produced purely on the basis of the same parts/components taken from the shelf in a storage. The fitting takes place by use of a template that shapes the physical structures of the oil filtering unit to the correct oil filter. The shaping takes place by forming, e.g. turning, the first physical structure to the correct shape by use of a master/template. The shaping in the oil filters can take place either as part of the end of the production, i.e. during assembling of the oil filter, or during casting of the oil filter by use of specially designed tools for casting which can be adjusted/configured to make different physical structure combinations by use of adjustable masters/templates. Thus, the physical structures are easy to produce and cheap to manufacture.

It is foreseen within the present invention that the oil filtration unit may not comprise a central projection, but that the at least one first physical structure is arranged along the central axis of the oil filtration unit.

In one embodiment, the cross-sectional shapes of the at least one first and second physical structure can be non-circular across the central axis of the oil filtration unit.

This is an advantage as making use of a circular shape across the central axis of the oil filtration unit would increase the risk of deliberate misuse of the oil filtration system or the risk of unintentional misuse of the oil filtration system due to wear, at least in the case where only one first and one second physical structure are applied. However, it is obviously within the scope of the present invention to make use of substantially circular shapes such as oval shapes.

In one embodiment, the oil filtration system can comprise sealing between the oil filtration unit and the oil filter so as to prevent oil-to-be-filtered (influent) from bypassing the oil filter and flowing directly to the outlet tube of the oil filtration unit. The sealing may be formed between the material of the oil filter and the material of the oil filtration unit, such as between a surface of the oil filter and of the oil filtration unit, respectively. When providing that at least one of the end surfaces of the oil filter relative to the central axis of the oil filter comprises the at least one second physical structure, sealing may be formed by the close fit between the first and second physical structures and thus be formed between the material of the oil filter, such as cellulose, and the material of the first physical structure, such as metal. Therefore, sealing may be provided without use of additional sealing means such as O-rings or other mechanical elements.

In one embodiment, the at least one first and/or second physical structure can comprise a sealing means arranged between the at least one first and second physical structure. After installation of the oil filter in the oil filtration unit, the only parts of the oil filtration system, which are not fixedly attached to each other, are the at least one first and second physical structure. Thus, there is a risk of dirty unfiltered oil bypassing/leaking into the cleaned/filtered oil without passing through the oil filter—from influent to effluent. Obviously, this is not wanted. Thus, it is an advantage to arrange a sealing between the at least one first and second physical structure to minimise or at best to eliminate any leakage as minimising or eliminating leakage would result in a better and more efficient oil filtration. Special means can be inserted, formed or shaped between the at least one first and second physical structure to make up for the sealing, or sealing can take place only between the at least one first and second physical structure. Thus, a sufficient sealing would exist between close-fitted first and second physical structures, e.g. in the case where the first physical structure is formed in a metal and the second physical structure is produced as part of an end surface of the oil filter, e.g. in a cellulose material. Thus, a simple and low-cost oil filtration system is provided.

In an embodiment, the at least one first and/or second physical structure can comprise at least part of a sealing means arranged between the oil filtration unit and the oil filter. Thus, a sealing means may be arranged between both the at least one first and/or second physical structure and between another part of the oil filtration unit and of the oil filter, such as a surface, so as to provide an extra sealing means and thus an extra guaranty for preventing oil-to-be-filtered from bypassing the oil filter.

In one embodiment, where a first physical structure can be arranged at the central projection of the oil filtration unit, and at least one first physical structure may not be arranged at the central projection of the oil filtration unit, and corresponding second physical structures can be provided at the oil filter, the sealing means can be arranged between only the first physical structure, which is arranged at the central projection of the oil filtration unit, and the corresponding second physical structure. The remainder at least one first physical structure and corresponding second physical structure can thus be provided without any sealing means if they do not provide a possible passageway for the oil to be filtered from the outside of the oil filter to the inside opening of the oil filter and thus to the outlet part of the oil filtration unit. However, it is obviously foreseen by the present invention that the sealing can be arranged between one of the remainder at least one first physical structure and corresponding second physical structures or between several of the first and second physical structures.

In one embodiment of the present invention, the sealing means can comprise a sealing ring arranged at an outer surface of the at least one first physical structure or at an inner surface of the at least one second physical structure. Advantageously, the shape of the sealing ring is made similar to the cross-sectional shape of the physical structure, so that sufficient and effective fitting can be made on either an outer surface of the at least one first physical structure or at an inner surface of the at least one second physical structure, or vice versa. Sealing rings have been known as sealing means for several years. They provide good and efficient sealing and can obviously be cheap depending on the material.

Optionally, the sealing means may not include a sealing ring.

In an embodiment, the sealing and/or sealing means can comprise an elevation. The elevation may be arranged either on the oil filter or on the oil filtration unit. Thus, the elevation may be arranged on the oil filtration unit and contact the oil filter, when the oil filter has been inserted in the oil filtration unit.

In one embodiment, the sealing and/or sealing means can comprise an elevation along the inner surface of the at least one second physical structure, the elevation preferably being a lip ring. Applying an elevation as sealing means has the advantage that the user thus does not have to worry about e.g. controlling whether the sealing ring is sufficiently new, intact and correctly placed when inserting a new oil filter. The sealing is already in place.

In an embodiment, the elevation can be arranged at an inner end surface of the oil filtration unit. Thus, when inserting the oil filter in the oil filtration unit, the oil filter may thus come into contact with the elevation. The elevation may form a closed path around an oil outlet part of the oil filtration unit (e.g. the outlet tube or the opening of the inner end surface) and/or around the central opening of the oil filter when it has been installed in the oil filtration unit. When the oil filter has been inserted in the oil filtration unit, the elevation may thus protrude or cut into the oil filter, at least partly. The width of the elevation may decrease with increasing distance from the inner end surface of the oil filtration unit such as an edge of a knife so as to facilitate the ability of the elevation to protrude or cut into the oil filter so that sealing is provided between the oil filter and the oil filtration unit.

The elevation may be arranged at an inner end surface of the oil filtration unit with a form substantially similar to the outer periphery of the cross-sectional shape of the oil filter, but have a width/diameter slightly smaller than said outer periphery. For this rea-son, the elevation may protrude or cut into the oil filter near the edge of the oil filter relative to the longitudinal axis of the oil filter. Thus, maximal use of the oil filter is provided as the oil to be filtered cannot bypass part of the oil filter by choosing a shorter flow path through the oil filter. A bypass of part of the oil filter would result in said part of the oil filter not being used fully for filtering oil.

In an embodiment, the sealing and/or sealing means can comprise any natural or synthetic polymer, and/or the oil filter and/or the at least one second physical structure can comprise any natural or synthetic polymer. The applicant has gained the knowledge that natural or synthetic polymer can cover the scope of the materials which can advantageously be applied for producing the sealing means and/or the at least one second physical structure, e.g. materials such as cellulose and polypropylene POM. Natural or synthetic polymer are cheap to produce and efficient to use e.g. in terms of sealing and manufacturing.

In one embodiment, the oil filter and/or the at least one second physical structure can comprise cellulose material. The term oil filter is to be understood so as to include all types and shapes of oil filter used in the technical field of the invention. Advantageously, the oil filter can comprise a cellulose material as the applicant has acquired the knowledge that oil filters comprising cellulose material provide a reliable, sufficient and less expensive material that is easy to work with. Other materials suitable for oil filtration are, however, foreseen within the scope of the present invention.

In one embodiment, the predefined longitudinal length of the at least one first physical structure and/or of the at least one second physical structure can be larger than the width of the sealing means. When using oil filters in oil filtration systems for filtering oil, it is known that the oil filter can shrink with time if the oil filter comprises e.g. cellulose, which is an organic material, and is put under a high pressure difference between the influent and effluent side of the oil filter. As the at least one first and second physical structure are not fixedly attached, they will move relative to each other in the longitudinal direction (central axis), when the oil filter shrinks. Thus, it is an advantage that the at least one first and second physical structure can move relative to each other without risking that the sealing is lost. Preferably, the predefined longitudinal lengths of the at least one first and second physical structure are thus sufficiently larger than the width of the sealing means. Thus, the risk of leakage is eliminated.

In one embodiment, the at least one first physical structure comprises an opening extending along the longitudinal axis of the first physical structure thus facilitating outlet of the filtered oil from the central opening of the oil filter as this reduces the complexity of the setup of the oil filtration system. Alternatively, the end surface of the oil filtration unit may comprise an opening extending along the central axis of the oil filter.

The structure and function of the oil filtration system will be described in more detail below with references to exemplary embodiments shown in the drawings wherein.

FIG. 7 shows a cut-out of the exploded view of FIG. 6a.

In the figures, the oil filtration unit and oil filter are shown having a cylindrical shape. However, it should be understood that other shapes, such as cubic, many-sided, and other shapes that may be envisioned by the person skilled in the art may also be within the scope of the present invention.

Figure 1:
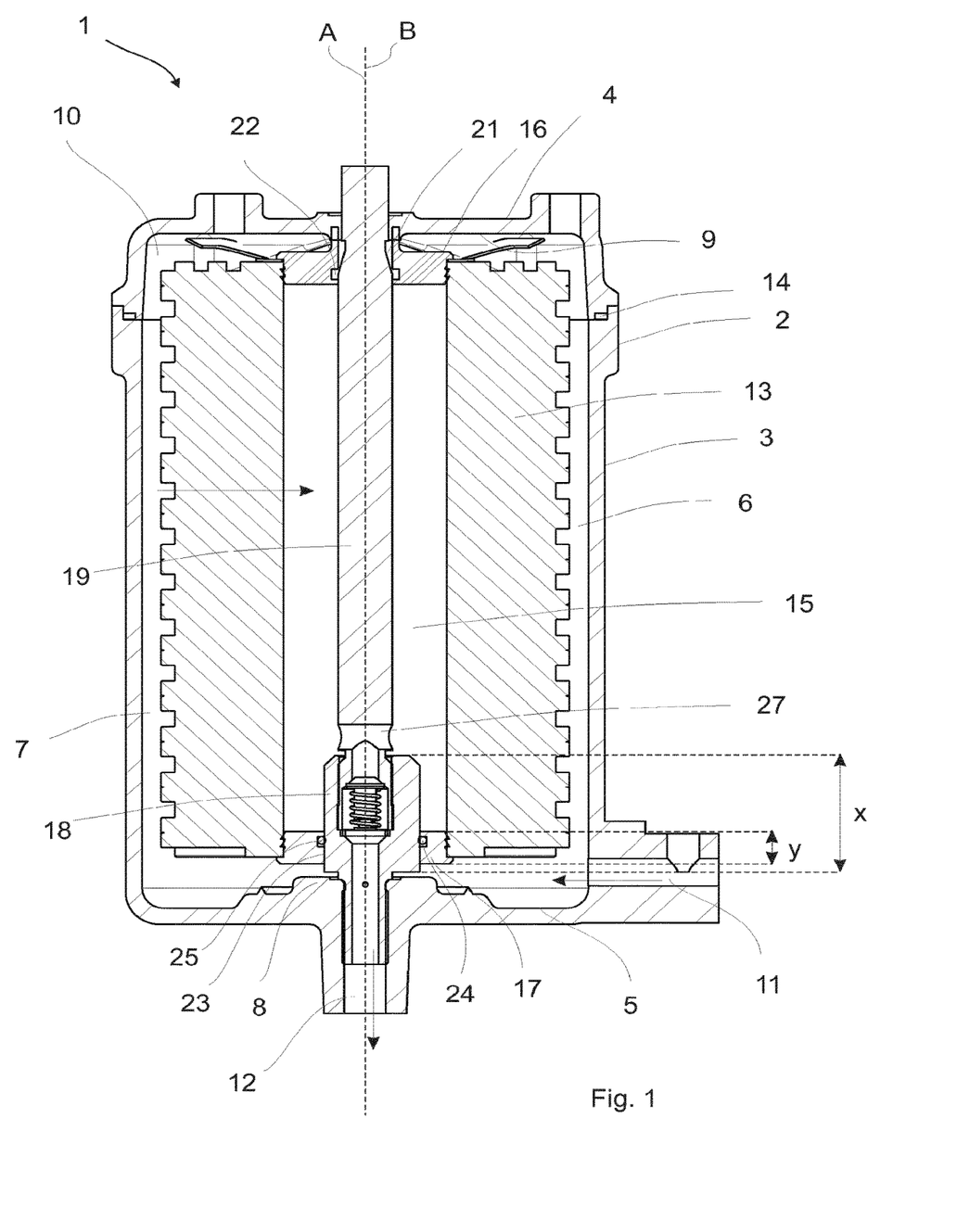
FIG. 1 shows a cross section of one embodiment of the oil filtration system, seen in a side view.

FIG. 1 shows a cross section of one embodiment of the oil filtration system 1, seen in a side view. The oil filtration unit 2 comprises two parts, a first part 3 and a second part 4. The first part 3 may be seen as the body and the second part 4 as the lid of the oil filtration unit 2. In the exemplary embodiment shown in FIG. 1, the oil filtration unit 2 has a cylindrical shape, and the first part 3 comprises an inner end surface 5 and an inner side surface 6 defining an inner opening 7. The inner end surface 5 may comprise a central projection 8 extending along a central axis A of the oil filtration unit 2. The second part 4 comprises an inner end surface 9 (not shown) with slightly bent edges 10. The first part 3 is connected to an inlet tube 11 providing an inlet flow of oil to be filtered (indicated by arrow) and to an outlet tube 12 providing an outlet flow of filtered oil (indicated by the arrow). Thus, the first part 3 is connected to the apparatus (not shown) containing the oil which is to be filtered by the oil filtration unit 2. The second part 4 may be connected to said apparatus through its connection to the first part 3. Thus, after installation of an oil filter 13 into the inner opening 7 of the oil filtration unit 2, the first 3 and second part 4 are connected to each other and sealed by use of a sealing means arranged in a rim 14, so that oil cannot leak out of the oil filtration unit 2.

In the exemplary embodiment shown in FIG. 1, the oil filter 13 has been inserted into the oil filtration unit 2. The oil filter 13 may have a central opening 15 extending along a central axis B of the oil filter 13 which is in this case converging with central axis A of the oil filtration unit 2. At the open ends of the oil filter 13, a first 16 and a second planar structure 17 have been fixedly attached to the oil filter 13 by a liquid and/or hermetically tight attachment, e.g. by use of an adhesive. Other attachment means such as screws, welding, friction fitting, may also be foreseen within the present invention. A first physical structure 18 is provided in continuation of the central projection 8 of the inner end surface 5 and is mounted to a stay bolt 19 or may alternatively be integrated with the stay bolt 19. The stay bolt 19 may have a substantially cylindrical cross-sectional shape in the radial direction of the oil filtration unit 2 and may extend the whole length of the oil filter 13 thus extending out of the oil filtration unit 2 or alternatively into a cavity of the second part 4 of the oil filtration unit 2, where the second part increases the stability of the stay bolt 19. The first planar structure 16 has a central opening 21, the periphery of which is similar in shape to the outer periphery of the cross-section of the stay bolt 19. A sealing means in the shape of an O-ring (not shown) can be inserted in a rim 22 along the inner surface of the opening 21. The second planar structure 17 comprises a second physical structure 23, the inner periphery of which mates with the outer periphery of the first physical structure 18. A sealing means 24 in the shape of an O-ring can be inserted in a rim 25 along the inner surface 26 of the second physical structure 23 thus preventing oil from leaking from the unfiltered side to the filtered side—from influent to effluent—without passing through the oil filter 13.

The first 18 and second physical structures 23 may each have a predefined longitudinal length x and y, respectively. The predefined longitudinal lengths x and y are seen to be larger than the width of the rim 25 and thus of the applied O-ring 24. As described previously, oil filters 13 in oil filtration systems 1 are known to shrink with time due to the oil filter 13 being made of e.g. cellulose, which is an organic material and is put under a high pressure difference between the influent and effluent side of the oil filter 13. As the first 18 and second physical structures 23 are not fixedly attached, but are only attached via the O-ring 24, they will move relative to each other in the converging central axes A,B, when the oil filter 13 shrinks.

An outlet opening 27 is arranged for letting out filtered oil from the central opening 15 of the oil filter 13 to the outlet tube 12. Thus, during the filtration, the oil flows from the inlet tube 11 into the inner opening 7 of the oil filtration unit 2. Here, the oil flows through the oil filter 13 indicated by the arrow and into the central opening 15 of the oil filter 13. The now filtered oil is finally let out through the outlet opening 27 and the outlet tube 12.

Figure 2:
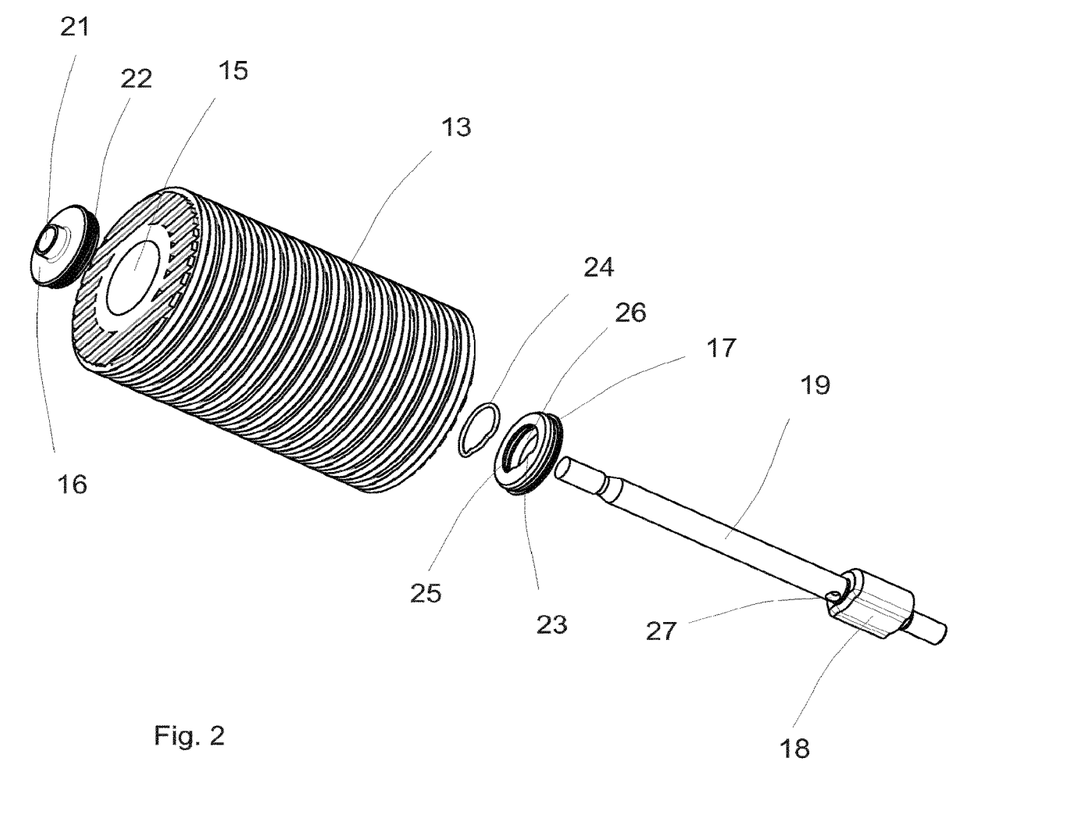
FIG. 2 shows an exploded view of an embodiment with one first and one second physical structure.

FIG. 2 shows an exploded view of an embodiment with one first 18 and one second physical structure 23. For similar parts, similar reference numbers have been used as in FIG. 1. In FIG. 2, the sealing means 24 comprises a sealing ring 24, e.g. an O-ring, arranged at the inner surface 26 of the second physical structure 23. The O-ring 24 is seen to have a non-circular shape which corresponds to the inner periphery of the second physical structure 23. Similarly, the outer periphery of the cross section of the first physical structure 18 corresponds to the inner periphery of the cross section of the second physical structure 23. The longitudinal axis of the first physical structure 18 may converge with the central axis A of the oil filtration unit 2. When the oil filter 13 is inserted into the oil filtration unit 2, the oil filter 13 comprising the second physical structure 23 is then inserted on top of the stay bolt 19 so that the stay bolt 19 penetrates the central opening 15 of the oil filter 13. When the second physical structure 23 touches the first physical structure 18, the oil filter 13 can be rotated in relation to the central axis A of the oil filtration unit 2 until the periphery of the cross sections of the first 18 and second physical structures 23 are oriented and angled correctly according to each other. Thus, the first 18 and second physical structures 23 can engage each other by pressing the oil filter 13 further onto the stay bolt 19. If the second physical structure 23 is not correctly oriented in relation to the first physical structure 18, the oil filter 13 may not be installed correctly in the oil filtration unit 2. It is foreseen within the present invention that the cross-sectional shape of the first 18 and/or second physical structure 23 may be un-uniform over the whole longitudinal extension of the first 18 and/or second physical structure 23, i.e. that only part of the cross-sectional shapes of the first and/or second physical structures may correspond to each other.

Figure 3:
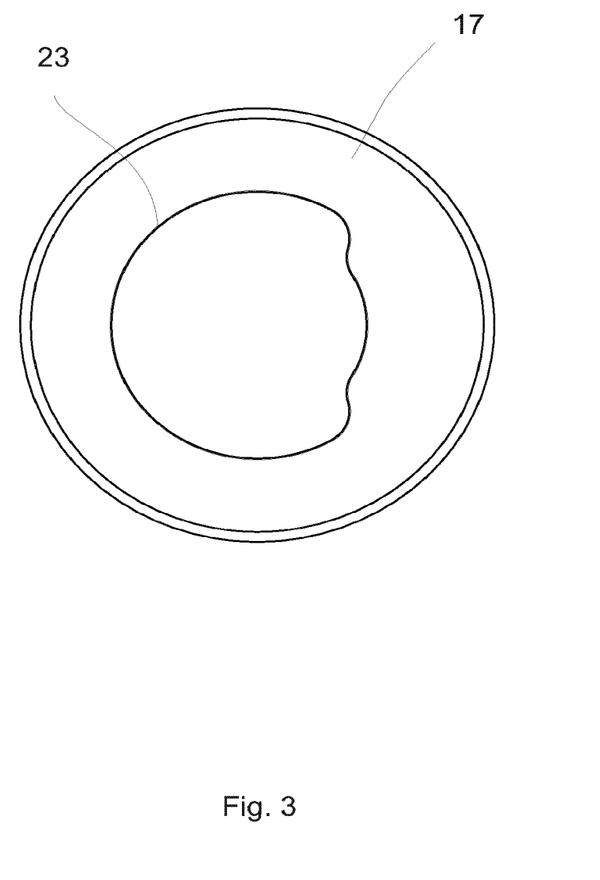
FIG. 3 shows a cross-sectional view of a second physical structure.

FIG. 3 shows a cross section of a second physical structure 23. The inner periphery is seen to have a non-circular shape. The first physical structure 18 has a mating outer periphery, where the diameter/size of the second physical structure 23 is equal to or slightly larger than the outer diameter/size of the first physical structure 18. Other shapes and sizes are foreseen within the scope of the present invention.

Figure 4:
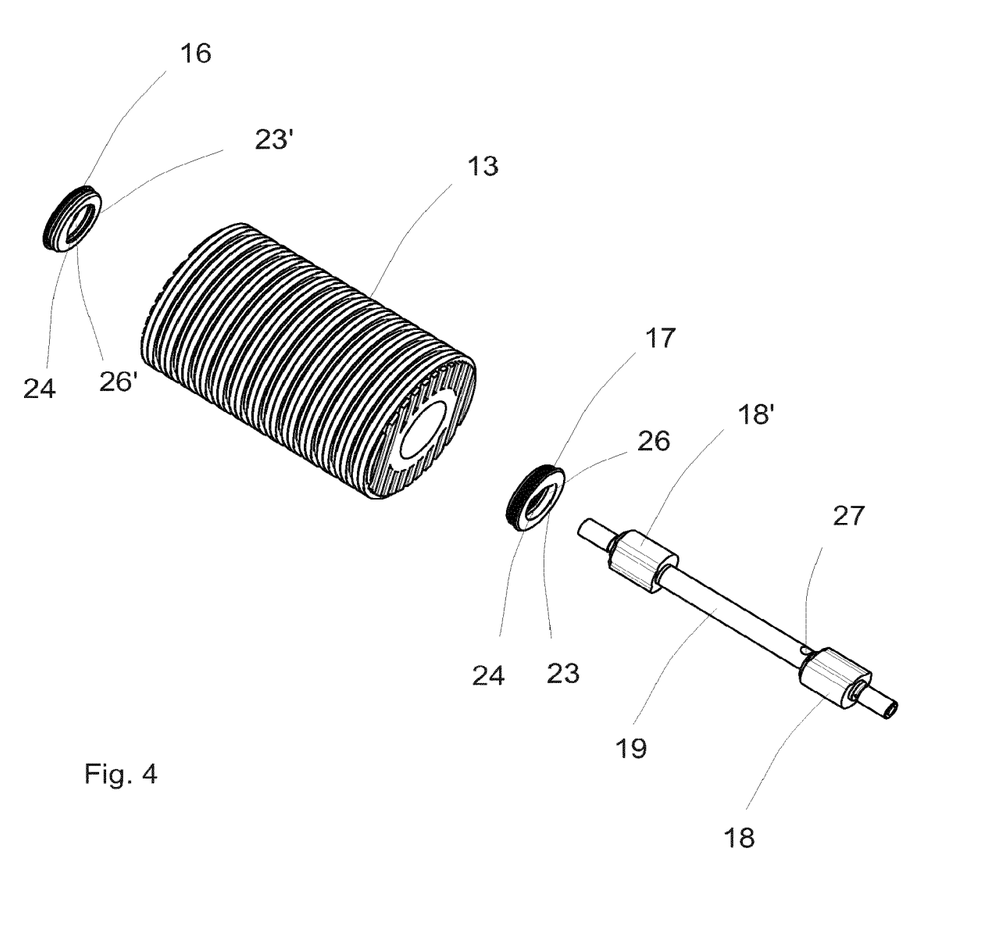
FIG. 4 shows an exploded view of an embodiment with two first and second physical structures.

FIG. 4 shows an exploded view of an embodiment with two first 18,18' and second physical structures 23,23'. For similar parts, similar reference numbers have been used as in the previous figures. In the figure, a first 16 and a second planar structure 17 are attached in separate ends of the oil filter 13. One second physical structure 23' is arranged in the first planar structure 16, and one second physical structure 23 is arranged in the second planar structure 17. A sealing means 24 in the form of an O-ring 24 is arranged at the inner surface 26,26' of each of the second physical structures 23,23'. One first physical structure 18,18' is arranged in the vicinity of each of the ends of a central projection 19 in the form of a stay bolt 19, so that they can each engage their respective second physical structure 23,23' and thus form a respective first 18,23 and second set 18',23' of first and second physical structures. Said two sets 18,23; 18',23' are seen to be angled axially in relation to each other, but may also not be angled. In some cases, making use of one first 18 and second physical structure 23 could possibly be insufficient to avoid installation of the wrong type of oil filter 13. After being operated for a long time, the first physical structure 18 could be at risk of being worn out of shape which could result in another type of oil filter 13 fitting into place. Furthermore, making use of one first 18 and second physical structure 23 could in some cases open up for a deliberate amendment of the first physical structure 18 and thus the type of oil filter 13 used. Instead, making use of two first 18,18' and two second physical structures 23,23' minimises the above-mentioned risks of wrong use of the oil filtration unit 2 as not one physical structure 18, but two have to be worn out of shape or amended. A further advantage is that having two first 18,18' and second physical structures 23,23' increases the number of different types of oil filters 18 that can be designed.

Figures 5A, 5B:
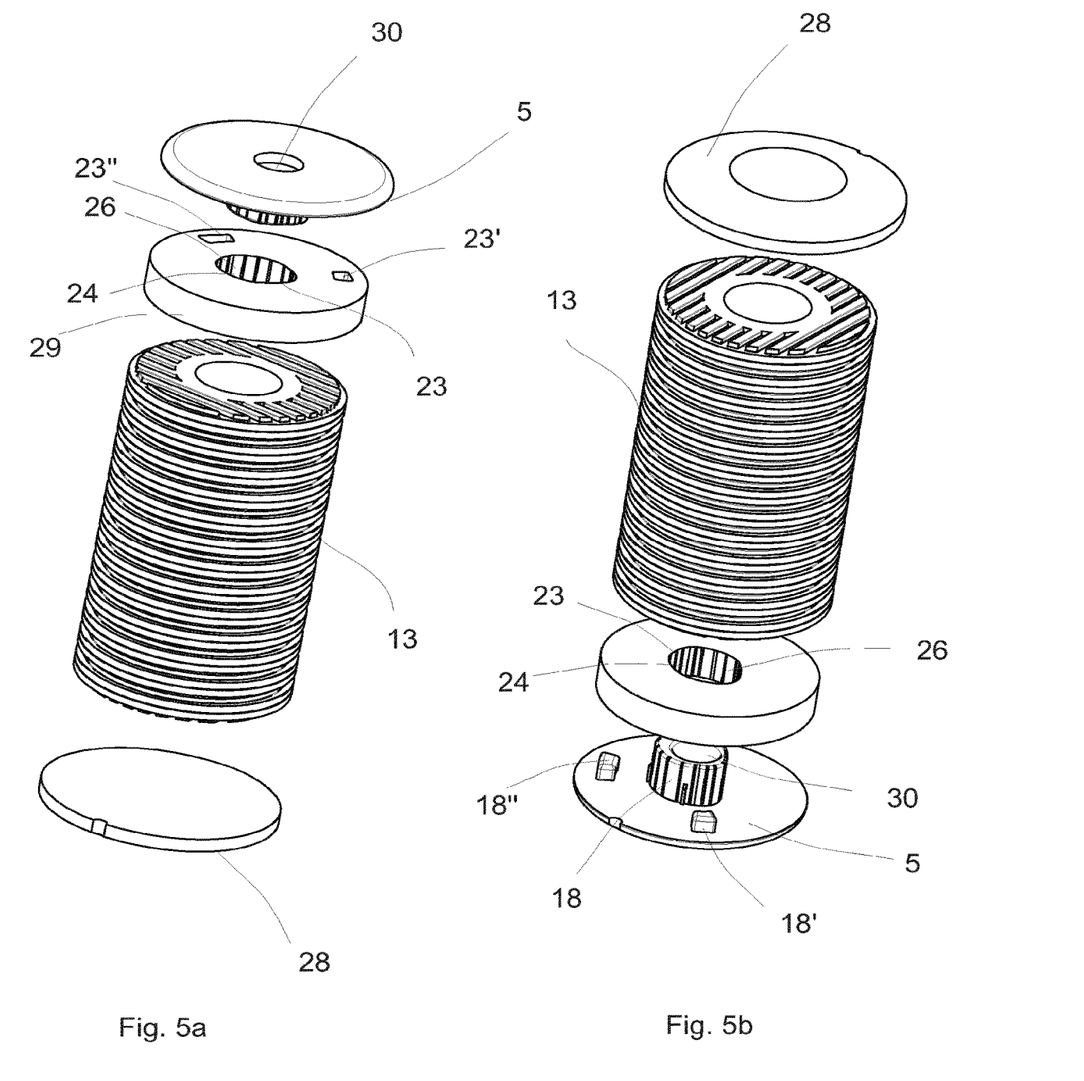
FIGS. 5a and 5b show an exploded view of an embodiment with several first and second physical structures, seen from both ends.

FIGS. 5a and 5b show an exploded view of an embodiment with several first 18 and second physical structures 23, seen from opposite ends. For similar parts, similar reference numbers have been used as in the previous figures. In FIG. 5a, the oil filter 13 has been closed at the one end by a closed first end surface 28 of the oil filter 13. At the opposite end of the oil filter 13, a second end surface 29 of the oil filter 13 comprises a second physical structure 23 arranged at the central axis B of the oil filter 13 and defining a through-going opening of the second end surface 29. Two further second physical structures 23',23" are arranged away from said central axis B, and are not through-going. The three second physical structures 23,23',23" have separate second cross-sectional shapes. Corresponding first physical structures 18,18',18" (not shown) are arranged at the end surface 5 of the oil filtration unit 2. The inner surface 26 of the second physical structure 23 arranged at the central axis B of the oil filter 13 constitutes a sealing means. The filtered oil exits the filter via the opening 30.

In FIG. 5b, the embodiment is shown from the opposite end. The three first physical structures 18,18',18" are seen arranged at the inner end surface 5 of the oil filtration unit 2. The outer periphery of the cross section of the first physical structures 18,18',18" mate with the inner periphery of the cross section of the respective second physical structures 23,23',23".

Figures 6A, 6B:
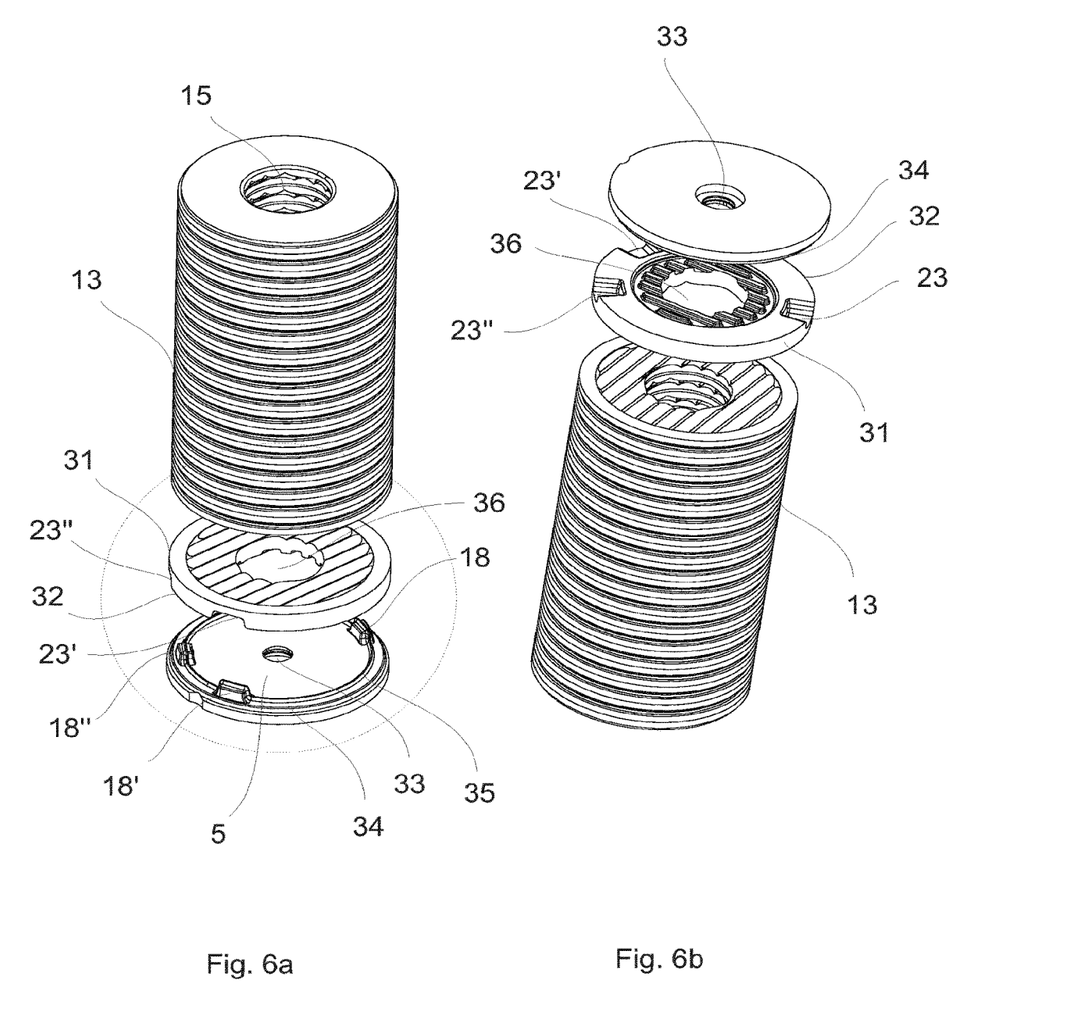
FIGS. 6a and 6b show an exploded view of an embodiment with several first and second physical structures, both shown in a perspective view.

FIGS. 6*a* and 6*b* show an exploded view of an embodiment with several first and second physical structures, both seen in a perspective view. For similar parts, similar reference numbers have been used as in the previous FIGS. In FIG. 6*a*, the oil filter 13, an end surface 31 of the oil filter 13 and an inner end surface 5 of the oil filtration unit 2 is seen.

Said end surface 31 of the oil filter 13 is shown as separated from the oil filter 13 and as shown may have the form of a disc. However, the end surface 31 may be assembled with the oil filter 13, e.g. by use of an adhesive, before introduction of the oil filter 13 into the inner opening 7 of the oil filtration unit 2 so as to facilitate easy handling of the oil filter 13 and to minimise the risk of oil leakage via the interface between the oil filter 13 and the end surface 31.

The end surface 31 of the oil filter 13 may have a size and shape so that the end surface 31 and the oil filter 13 together form a uniform oil filter 13 when assembled. Thus, when the oil filter 13 has e.g. a substantially cylindrical shape, the end surface 31 may have the shape of a disc and have a width similar to the width of the cylindrical oil filter 13 as is illustrated in FIG. 6*a*.

Thus, the end surface 31 may comprise a material similar to the material of the oil filter 13, such as any natural or synthetic polymer, e.g. cellulose material.

The end surface 31 may comprise one or more second physical structures as illustrated in FIG. 6*a* in which a first 23 (not shown), second 23' and third 23" second physical structure are arranged on the side oriented away from the oil filter 13 and oriented towards the inner end surface 5 of the oil filtration unit 2. The first 23, second 23' and third 23" second physical structures may be arranged along an outer edge 32 of the end surface 31 relative to a longitudinal axis of the end surface 31 and to the central axis B of the oil filter 13.

The inner end surface 5 of the oil filtration unit 2 is illustrated as a disc in FIG. 6*a*. However, it is understood within the concept of the present invention that said inner end surface 5 may be a separate element which may be inserted into an existing oil filtration unit 2 comprising side walls (such as a side surface 6) and an existing inner end surface 5 and be mounted on said existing inner end surface 5. Alternatively, the inner end surface 5 may be connected to side walls (such as a side surface 6) and thus together form e.g. the first part 3 of the oil filtration unit 2, or the inner end surface 5 may be produced together with the side walls of the oil filtration unit 2 and form a unit.

The inner end surface 5 may comprise an opening 33 through which filtered oil may flow from the central opening 15 of the oil filter 13 to the outlet tube 12 of the oil filtration unit 2. The opening 33 may be arranged along the longitudinal axis of the inner end surface 5 and thus along the central axis A of the oil filtration unit 2 as illustrated in FIG. 6*a*, but may also be arranged away from said longitudinal axis of the inner end surface 5 depending on location of the outlet tube 12.

The inner end surface 5 is illustrated as comprising three first physical structures, i.e. a first 18, second 18' and third 18" which are arranged on the inner end surface 5 and may comprise a shape so that they may mate with the three second physical structures 23,23',23" of the end surface 31 of the oil filter 13. Thus, said three first physical structures 18,18',18" may be arranged near an outer edge 34 of the inner end surface 5 of the oil filtration unit 2 and may as such be arranged in a circle. Thus, as the first and second physical structures may be arranged in a circle on the end surface 31 of the oil filter 13 and on the inner end surface 5 of the oil filtration unit 2, respectively, the pairs of first and second physical structures, which are arranged to mate with each other, may be angled axially relative to each other.

The inner end surface 5 may comprise an elevation 35. In FIG. 6*a*, it is illustrated that the elevation 35 may form a closed path and may form a circle on the inner end surface 5. As furthermore illustrated in FIG. 6*a*, the elevation 35 may run over each of the first physical structures 18,18',18". However, the elevation 35 may also have a non-circular shape and/or may run past each of the first physical structures 18,18',18".

When the oil filter 13 is introduced in the inner opening 7 of the oil filtration unit 2, the oil filter 13 is moved in a direction along the central axis A of the oil filtration unit 2 towards the inner end surface 5 so that the respective first 18,18',18" and second physical structures 23,23',23" mate with each other, and the elevation 35 comes into contact with the end surface 31 of the oil filter 13 and protrudes or cuts into the oil filter 13. Thus, sealing is provided between the oil filtration unit 2 and the oil filter 13. In this way, the oil to be filtered is prevented from flowing from the inner opening 7 of the oil filtration unit 2 to the central opening 15 of the oil filter 13 via the interface between said inner end surface 5 and said end surface 31 and thus bypassing the oil filter 13.

In FIG. 6*b*, the oil filter 13, the end surface 31 of the oil filter 13 and the inner end surface 5 of the oil filtration unit 2 are seen from the opposite end. In FIG. 6*b*, the three second physical structures 23,23',23" are seen to be arranged on the end surface 31 of the oil filter 13, and being angled axially relative to each other. The end surface 31 of the oil filter 13 may comprise an opening 36 to facilitate that filtered oil may flow from the central opening 15 of the oil filter 13 to the opening 33 of the inner end surface 5.

Figure 7:
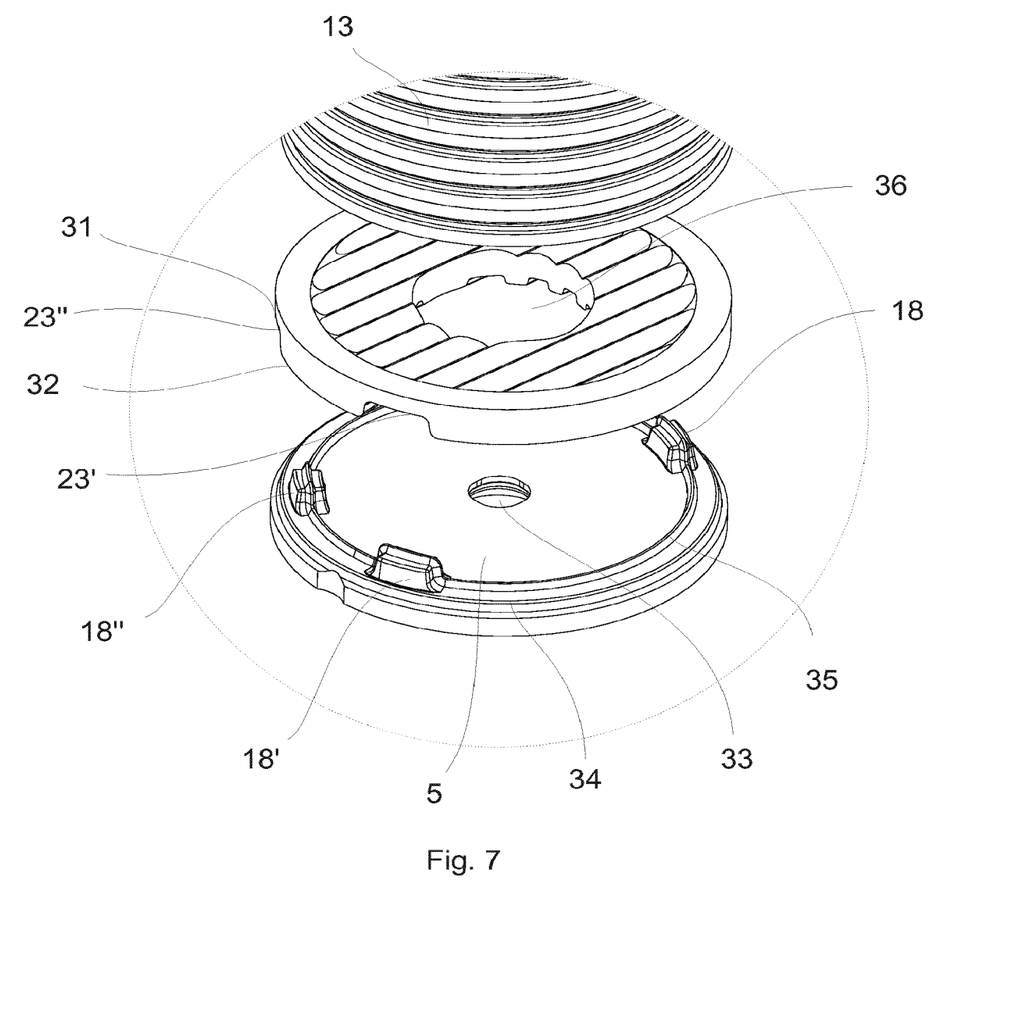

FIG. 7 shows a cut-out of the exploded view of FIG. 6*a* and shows inter alia the elevation 35 arranged on the inner end surface 5 of the oil filtration unit 2. The elevation 35 may form a closed path around the opening 33 of the inner end surface 5 and/or around the central opening 15 of the oil filter 13. When the oil filter 13 has been inserted in the oil filtration unit 2, the elevation 35 may thus protrude or cut into the end surface 31 of the oil filter 13, at least partly. The width of the elevation 35 may decrease with distance from the inner end surface 5 of the oil filtration unit 2 and may therefore have the shape of the edge of a knife so as to facilitate the ability of the elevation to protrude or cut into the oil filter 13.

Figure 8A:
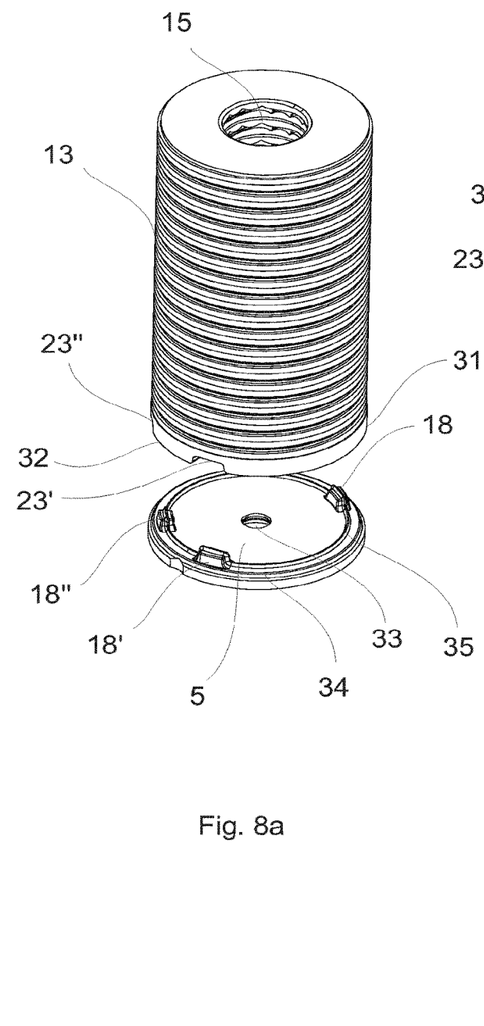
FIGS. 8a and 8b show an exploded view of an embodiment with several first and second physical structures, both shown in a perspective view.
Figure 8B:
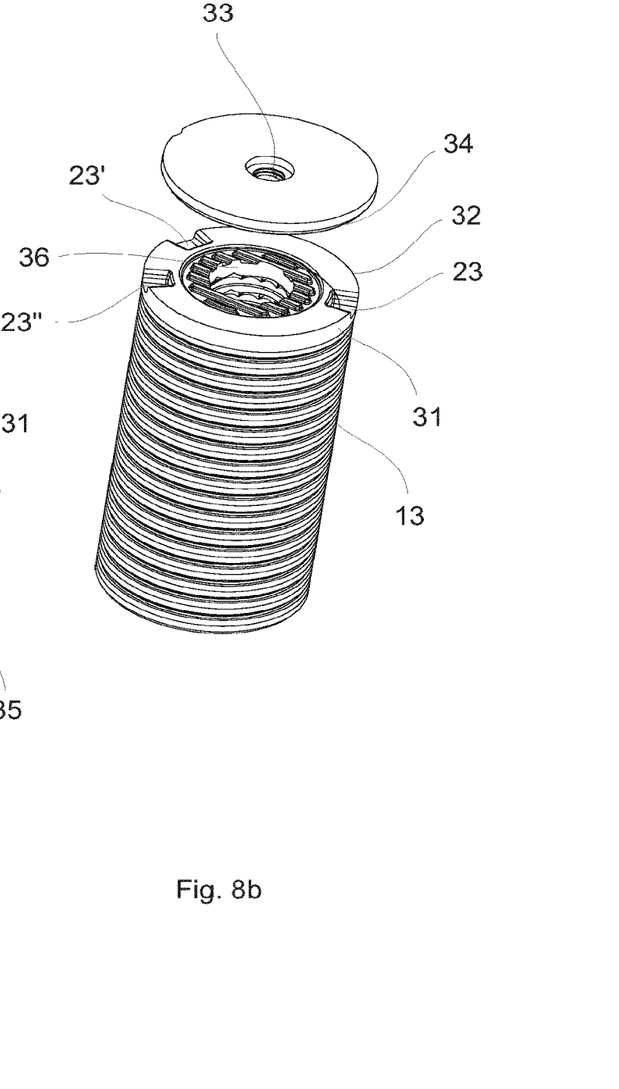

FIGS. 8*a* and 8*b* show an exploded view of an embodiment with several first and second physical structures, both shown in a perspective view. For similar parts, similar reference numbers have been used as in the previous FIGS. In FIGS. 8*a* and 8*b*, the end surface 31 of the oil filter 13 has been assembled with the oil filter 13, e.g. by use of a liquid and/or hermetically tight attachment, e.g. by use of an adhesive.

Modifications and combinations of the above principles and designs are foreseen within the scope of the present invention.

What is claimed is:

1. An oil filter for an oil filtration system, wherein the oil filter is configured for insertion into an oil filtration unit being provided with at least one first physical structure having a first cross-sectional shape and a predefined longitudinal length in relation to a central axis of the oil filtration unit, wherein the oil filter comprises:

a central opening extending along a central axis of the oil filter, three second physical structures, each physical structure having a second cross sectional shape and a predefined longitudinal length in relation to the central axis of the oil filter, and an inner periphery of the respective second physical structures being arranged to mate with the outer periphery of the first physical structure allowing the oil filter to reach its correct insertion position in the oil filtration unit by the second physical structures at least partly surrounding the first physical structure, wherein the end surface of the oil filter relative to the central axis of the oil filter comprises the three second physical structures, and the second physical structures are created from filtering material wherein the at least one second physical structure is shaped to mate with the at least one first physical structure at the end surface of the oil filtration unit.

2. An oil filter according to claim 1, wherein the oil filter comprises two second physical structures angled axially in relation to each other.

3. An oil filter according to claim 2, wherein the second physical structures are arranged in a circle on the end surface of the oil filter, and are arranged to mate with correspondingly positioned first physical structures on the oil filtration unit.

4. An oil filter according to claim 1, wherein the cross-sectional shapes of the second physical structure are non-circular across the central axis of the oil filtration unit.

5. An oil filtration unit for an oil filtration system, wherein the oil filtration unit is configured to receive an oil filter according to claim 1, wherein the oil filtration unit is provided with at least one first physical structure having a first cross-sectional shape and a predefined longitudinal length in relation to a central axis of the oil filtration unit.

6. An oil filtration unit according to claim 5, wherein the at least one first physical structure is shaped to mate with the second physical structures on the oil filter.

7. An oil filtration unit according to claim 5, wherein the oil filter comprises two first physical structures angled axially in relation to each other.

8. An oil filtration unit according to claim 5, wherein the oil filter comprises three first physical structures.

9. An oil filtration unit according to claim 7, wherein the first physical structures are arranged in a circle to mate with correspondingly positioned second physical structures on the oil filter.

10. An oil filtration unit according to claim 5, wherein the cross-sectional shape of the first physical structure are non-circular across the central axis of the oil filtration unit.

11. An oil filtration system comprising an oil filter according to claim 1 and an oil filtration unit according to claim 5.

12. An oil filtration system according to claim 11, wherein the oil filtration system comprises a sealing between the oil filtration unit and the oil filter.

13. An oil filtration system according to claim 11, wherein the at least one first and/or second physical structure comprises a sealing means arranged between the at least one first and the at least one second physical structure.

14. An oil filtration system, comprising:
an oil filtration unit,
an oil filter having a central opening extending along a central axis of the oil filter,
the oil filtration unit being provided with at least one first physical structure having a first cross-sectional shape and a predefined longitudinal length in relation to the central axis of the oil filtration unit,
the oil filter being provided with three second physical structures, each second physical structure having a second cross sectional shape and a predefined longitudinal length in relation to the central axis of the oil filter and
an inner periphery of the respective second physical structures being arranged to mate with the outer periphery of the first physical structure allowing the oil filter to reach its correct insertion position in the oil filtration unit by the second physical structure surrounding the first physical structure at least partly,
wherein at least one of the end surfaces of the oil filter relative to the central axis of the oil filter comprises the three second physical structures, and the second physical structures are created from filtering material wherein the at least one second physical structure is shaped to mate with the at least one first physical structure at the end surface of the oil filtration unit.

15. An oil filtration system according to claim 14, wherein the oil filtration unit has a projection extending in the direction of the central axis of the oil filtration unit.

16. An oil filtration system according to claim 14, wherein the oil filtration unit has a central projection extending along a central axis of the oil filtration unit, and where the central opening of the oil filter is adapted to be introduced onto the central projection of the oil filtration unit in the direction of the central axis of the oil filtration unit.

17. An oil filtration system according to claim 14, wherein the oil filtration system comprises sealing between the oil filtration unit and the oil filter.

18. An oil filtration system according to claim 17, wherein the sealing and/or sealing means comprise an elevation.

* * * * *